Figures 1, 2:
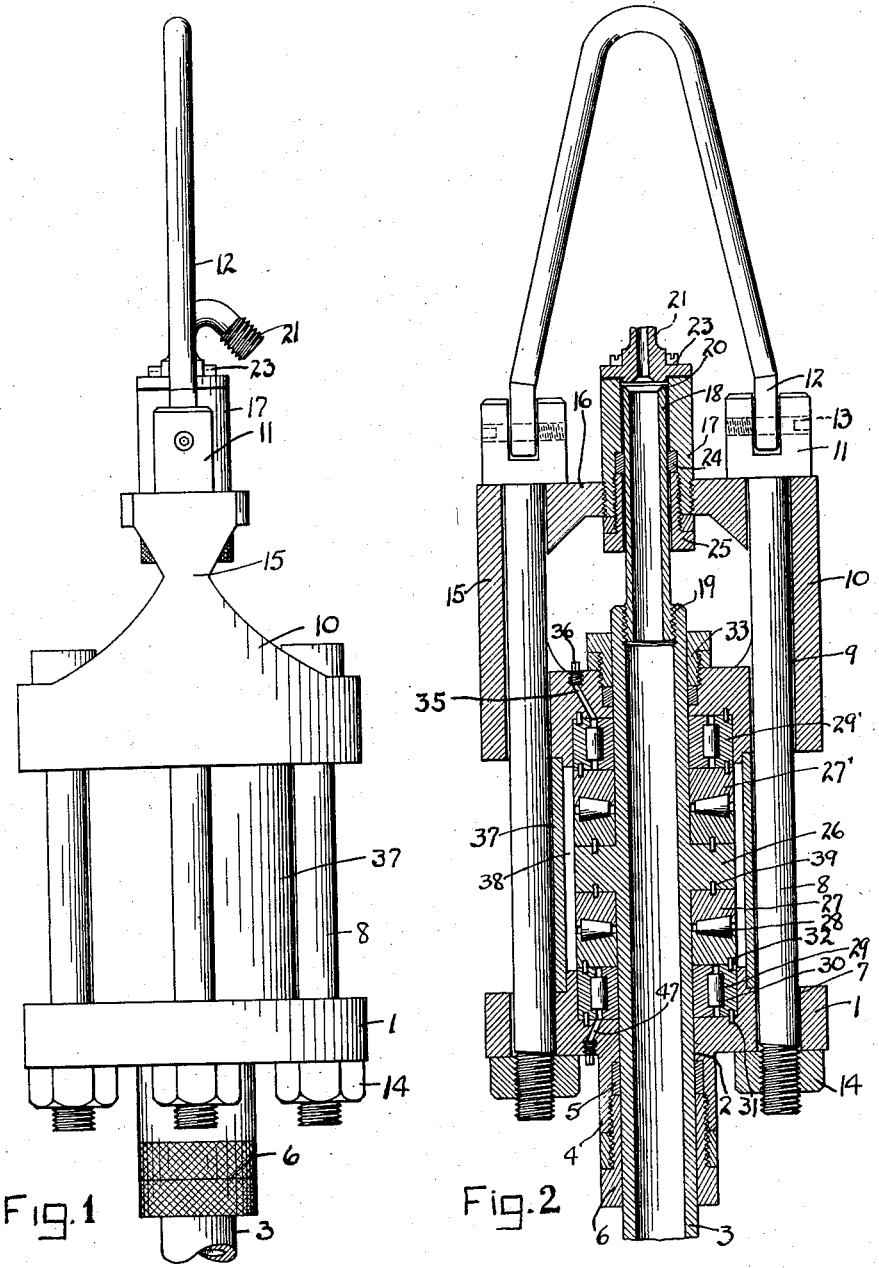

Feb. 4, 1930.  E. GRAY  1,746,036

SWIVEL

Filed July 30, 1927

Ellsworth Gray  Inventor

By Jesse R. Stone

Attorney

Patented Feb. 4, 1930

1,746,036

UNITED STATES PATENT OFFICE

ELLSWORTH GRAY, OF HOUSTON, TEXAS, ASSIGNOR TO GRAY TOOL COMPANY, OF HOUSTON, TEXAS, A CORPORATION OF TEXAS

SWIVEL

Application filed July 30, 1927. Serial No. 209,542.

My invention relates to swivels such as are employed in well drilling to provide means for supporting the rotating drill stem and for allowing the connection with the drill stem of means to force the fluid into the drill stem to the drill during the drilling operation.

It is an object of the invention to provide a light but strong construction of swivel in which the number of parts are reduced to a minimum.

It is a further object to provide an attachment for the supporting bail which will prevent lateral tipping of the swivel in use but which will be sturdy in construction and will serve the further purpose of holding the parts of the swivel together.

It is also an object to so support and house the bearings that they will be easy to lubricate and will furnish a bearing tending to take up any side thrust on the swivel due to the tilting of the drill stem in use. The invention resides particularly in the construction and arrangement of the parts making up the swivel whereby these objects are accomplished.

Referring to the drawing herewith, Fig. 1 is a side elevation of the swivel embodying my invention. Fig. 2 is a central vertical section through the swivel shown in Fig. 1, the view being taken at right angles to the position shown in Fig. 1.

In constructing my swivel I provide a lower supporting lock or plate 1, which has a central opening 2 therethrough to receive the tube 3 for the flushing water. Below the opening 2 a nipple 4 is extended downwardly to form a stuffing box to receive packing 5 adjacent the tube 3, said box outside the packing being threaded to receive a gland 6 for compressing the packing in the usual manner.

The plate 1 outside the central portion is provided with openings 7 to receive supporting bolts 8. I have shown four of these bolts, although obviously two or more may be employed, as desired.

These bolts are extended upwardly through openings 9 in an upper block 10. Above said block 10 two of said bolts are provided with heads 11 with slots therein to receive the lower ends of a bail 12, said bail being pivoted upon pins 13 extending through the sides of the head and through the ends of the bail. Nuts 14 on the lower ends of the bolts 8 allow the parts of the swivel to be clamped rigidly together, as will be later understood.

The block 10 at the upper end of the swivel has two side posts 15 which connect the lower end with an upper transverse member 16, which supports a central bushing 17. Said bushing is shaped to fit about the upper neck 18 of the tube 3 to which it is connected at 19. Said neck is provided with an inwardly beveled opening 20 at its upper end to receive flushing fluid which is adapted to enter thereto through the goose neck 21. Said goose neck is of the usual shape, having its forward end 22 threaded for connection to a hose coupling. Its lower end is formed into a plate adapted to be secured to the bushing 12 by means of bolts or screws 23. The lower end of the bushing 17 is threaded within the transverse member 16 of the block and has a stuffing box fitting about the neck 17 of the tube, said stuffing box including packing 24 and a gland 25 thereon in the usual manner.

The tube 3 for the flushing fluid fits within the lower end of the block 10 centrally thereof and has midway between the block 10 and the plate 1 a radially extending flange 26 which acts as a support for the said tube. Below the flange 26 is a bearing race 27 having cone-shaped bearings 28 therein, said bearing race being supported upon a lower side thrust bearing 29. Said bearing 29 is provided with rollers 30 therein arranged to take the side thrust upon the tube 3 and the swivel while the device is operating. The said race 29 is seated within the upper side of the plate 1 and the outer portion thereof is connected with the said plate by dowels 31 and with the bearing race 27 by dowels 32.

Above the flange 26 and between the same and the lock 10 are a second race 27', to take up the vertical thrust, and a bearing race 29', to take up the side thrust, the said bearings fitting between the said flange and a cup-shaped recess in the head 10. A stuffing box, indicated at 33, makes a close fit between the tube 3 and the head of the block 10 so as to prevent the escape of fluid between the said block and bearings. A lubricating passage 35 may be formed in the block 10 above the bearings to allow lubricant to be added to the said bearings whenever desired, the upper end of said duct being closed by a screw plug 36. A similar drainage channel 47 is formed in the block 1 below the bearings, as will be seen in Fig. 2.

Outside the bearings and the flange 36 is a sleeve 37, which surrounds the bearings and forms a chamber 38 therein between the block 10 and the plate 1 to contain lubricant for the bearings. The upper and lower ends of said sleeve are fitted tightly within the plate 1 and block 10 so that no lubricant can escape.

When the parts are assembled the lower plate 1 is secured in position over the tube 3 with the bearing race 29 and 27 in position below the flange 26. The dowels 31 and 32 prevent rotation of the stationary portion of the races, the upper portion of the bearing 27 being secured to the flange 26 by dowels 39 so that it is held rotatably with the tube 3 when the drill stem is operated. The upper block 10 of the bearings 27' and 29' are then placed above the flange 26, the sleeve 37 being fitted between the block and the plate. The bolts 8 are then inserted downwardly through the head 10 and the plate 1 and the nuts tightened in position to hold the parts thus assembled. It will be obvious that the nuts 14 may be screwed tightly so as to hold the parts tightly assembled and the weight of the swivel and the supported drill stem will be sustained by the said bolts 10 within the plate 1. The goose neck may be then secured in position upon the bushing 17 and the bail 12 attached to the heads of the bolts.

It is to be noted that the weight is below the attachment of the bail to the swivel and that the weight is supported close in toward the center of gravity so that there is little side sway or thrust coming upon the bearings of the swivel. The support is a strong and simple one and it is possible at any time to quickly disassemble the entire device so that the parts will be accessible for adjustment or repair. The device is simple in construction and is economical to manufacture. The further advantages of the construction will be obvious to those skilled in the art.

What I claim as new is:

1. A swivel including a lower plate, an upper block, bolts connecting said plate and block, a spacing sleeve between said plate and block, a tube extending through said plate and block, means to support said tube on said plate within said sleeve, a goose neck connected with said tube and a bail supporting said swivel.

2. A swivel including a lower plate, an upper block, bolts connecting said plate and block, a spacing sleeve between said plate and block, a tube extending through said plate and block, means to support said tube on said plate within said sleeve, a goose neck connected with said tube and a bail connected with the upper ends of two of said bolts and supporting said swivel.

3. A swivel including a lower plate, an upper block, bolts connecting said plate and block, a spacing sleeve between said plate and block, a tube extending through said plate and block, means to support said tube on said plate within said sleeve comprising a flange on said tube and anti-friction bearings above and below said flange, a goose neck connected with said tube and a bail supporting said swivel.

4. A swivel including a lower plate, an upper block, a spacing sleeve between them, a tube supported rotatably in said plate within said sleeve, bolts extended through said plate and block, heads on two of said bolts, and a bail secured pivotally to said heads.

5. A swivel including a lower plate, an upper block, a spacing sleeve between them, a tube supported rotatably in said plate within said sleeve, bolts connecting said plate and block and acting to clamp them together, and a bail secured to the upper ends of two of said bolts.

6. A swivel including upper and lower sections, means to detachably clamp said sections together, a tube rotatably mounted therein, means to deliver flushing fluid thereto, and a bail secured to said clamping means adjacent the upper end of said swivel.

7. A swivel including upper and lower sections, means to detachably clamp said sections together, a spacing sleeve between said sections, a fluid conducting tube journaled to rotate in said swivel, means to deliver fluid to said tube and means comprising a bail pivotally connected with said clamping means to support said sections.

8. A swivel including upper and lower sections, a spacing sleeve between said sections, means engaging both said sections to clamp said sleeve between said sections, a fluid conducting tube journalled to rotate in said swivel within said sleeve, means to deliver fluid to said tube and means to support said sections.

In testimony whereof I hereunto affix my signature this 23d day of July, A. D. 1927.

ELLSWORTH GRAY.